United States Patent Office 2,957,856
Patented Oct. 25, 1960

2,957,856

PHOSPHORUS-CONTAINING SPIROBI(META-DIOXANE) RESINS

Howard R. Guest, Charleston, and Ben W. Kiff, Ona, W. Va., assignors to Union Carbide Corporation, a corporation of New York No Drawing. Filed Aug. 29, 1958, Ser. No. 757,896

13 Claims. (Cl. 260—88.3)

This invention relates to flame-resistant organic materials derived from 3,9-dialkenylspirobi(meta-dioxane) derivatives. In a particular aspect, this invention relates to resins containing spirobi(meta-dioxone) groups and chemically-bound phosphorus.

Resins formed by the polymerization of spirobi(meta-dioxane) derivatives with polyols have many properties which make them commercially attractive. They are hard and tough and can be made with good clarity and color. However, in common with most other organic plastic materials commercially available, they suffer the disadvantage of being flammable. In many applications, particularly in the structural field, there would be great advantage in having strong, tough, rigid plastics with excellent weatherability characteristics which at the same time were flame-resistant.

A conventional method of reducing the flammability of a plastic is to incorporate mechanically a phosphorous-containing plasticizer into the plastic by milling or other similar operation. Considerable quantities of such plasticizers are required to produce this flame-resistance property in the plastic. Uusually the plasticizer modifies other properties of the plastic in a beneficial way at the same time. Plasticizers of this type include compounds such as tricresyl phosphate and trioctyl phosphate.

This method of reducing the flammability of plastics with phosphorous-containing plasticizers is not practical for polymers produced from spirobi(meta-dioxane) derivatives. These polymers are not compatible with many of the phosphorous-containing plasticizers, and when proper compatibility between the polymers and plasticizers is accomplished it is found that many of the desirable properties of the polymers are adversely affected. Further, no additive is known which can be mixed mechanically with spirobi(meta-dioxane) polymers to produce non-flammable compositions.

It is a main object of this invention to produce flame-resistant spirobi(meta-dioxane) polymers. Other objects and advantages of this invention will become apparent to those skilled in the art from the accompanying description and disclosure.

Accordingly, flame-resistant polymers are produced by reacting a mixture of 3,9-dialkenyl spirobi(meta-dioxane) and aliphatic polyhydric alcohol with pentaerythritol phosphite material of the class produced by hydrolysis of the reaction product derived from the condensation of pentaerythritol with phosphorus trichloride.

The pentaerythritol phosphite material employed is a mixture comprising a phosphorous acid ester formed in the following manner:

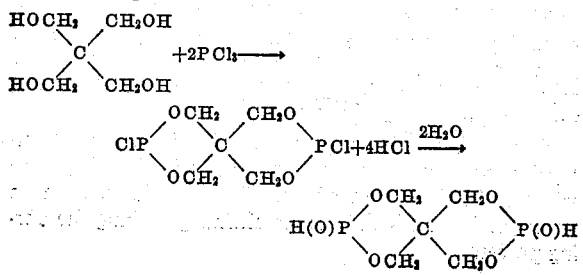

"Pentaerythritol phosphorous acid ester" as used hereinafter refers to the ester mixture obtained by hydrolysis of the reaction product of pentaerythritol with phosphorus trichloride. The ester mixture is acidic and has free hydroxyl groups capable of condensing with unsaturated compounds.

The 3,9-dialkenylspirobi(meta-dioxane) derivatives contemplated are those having an alkenyl substituent in the three-position and in the nine-position which contains between two and about eighteen carbon atoms. The respective alkenyl groups can be identical or different species. These unsaturated acetals can also be designated as 3,9-dialkenyl-2,4,8,10-tetraoxaspiro(5.5)undecane. A particularly useful group of these unsaturated acetal compounds are those derived from the reaction of acrolein and substituted acrolein with pentaerythritol. Such unsaturated acetals may be represented by the formula:

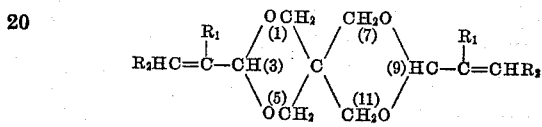

wherein $R_1$ is hydrogen, methyl or chlorine, and $R_2$ is hydrogen or methyl.

Unsaturated acetals which correspond to the formula include:

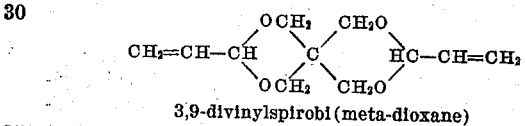

3,9-divinylspirobi(meta-dioxane)

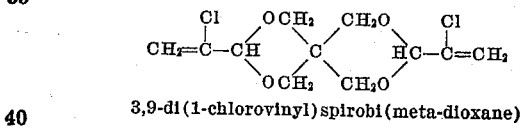

3,9-di(1-chlorovinyl)spirobi(meta-dioxane)

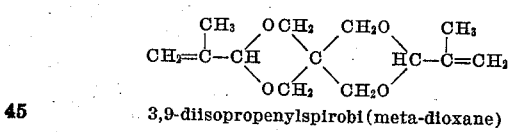

3,9-diisopropenylspirobi(meta-dioxane)

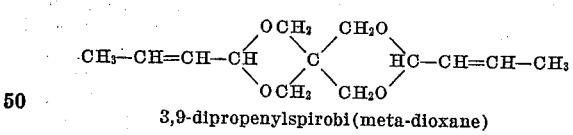

3,9-dipropenylspirobi(meta-dioxane)

Unsaturated spirobi(meta-dioxane) derivatives are readily prepared by the condensation of a mole of pentaerythritol with two moles of an unsaturated aldehyde or ketone, or mixtures thereof, in the presence of an acid catalyst such as p-toluenesulfonic acid. The following reaction schemes are particular illustrations of the general synthetic method. When acrolein is employed, an unsubstituted 3,9-divinylspirobi(meta-dioxane) is obtained:

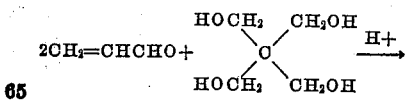

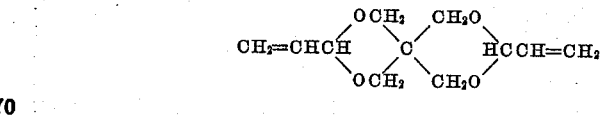

When the condensation is conducted with an unsaturated ketone then the three- and nine-positions of the spirobi(meta-dioxane) nucleus obtained have two substituents rather than one:

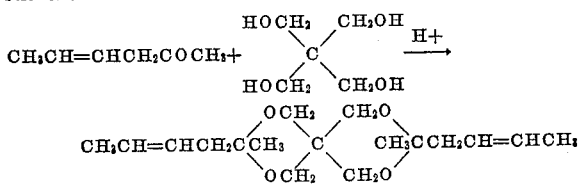

It is not necessary that the unsaturated aldehyde or ketone reacted with pentaerythritol be pure or a single species. Mixtures of unsaturated aldehydes and/or ketones may be condensed with pentaerythritol. The resulting products are mixtures of 3,9-(olefinically-substituted)spirobi(meta-dioxane) compounds which may be resolved into pure components or which may be used as crude mixtures directly in polymerization reactions.

The aliphatic polyhydric alcohols contemplated to be employed as a reactive comonomer in the formation of the flame-resistant polymers are members of this class of alcohols which are properly reactive and convenient to use which include aliphatic diols such as ethylene glycol, propylene glycol, butylene glycol, 1,4-butanediol, 1,6-hexanediol, 2-ethylhexane-1,3-diol; polyalkylene glycol derivatives such as diethylene glycol, triethylene glycol, pentaethylene glycol, dipropylene glycol, tripropylene glycol, and the like; aliphatic triols such as glycerol, 1,2,4-butanetriol, trimethylol ethane, trimethylolpropane; and higher polyols such as pentaerythritol, sorbitol, mannitol, dulcitol, 2,4-dihydroxy - 1,3 - di(hydroxymethyl)pentane, and the like. The ready availability, low cost, and high ratio of hydroxyl groups to molecular weight make pentaerythritol one of the most useful of the aliphatic polyhydric alcohols available. In addition, since pentaerythritol is employed to synthesize the 3,9-dialkenylspirobi(meta-dioxane) derivatives, it is of course advantageous to continue its use throughout the entire preparation of the polymers. Furthermore, its unique structure allows it to cross-link the unsaturated spirobi(meta-dioxane) derivatives in a way that confers the properties associated with a highly symmetrical molecule upon the polymer.

The reaction for producing flame-resistant spirobi(meta-dioxane) polymers can be conducted simply by heating a mixture of 3,9-dialkenylspirobi(meta-dioxane), aliphatic polyhydric alcohol and pentaerythritol phosphorous acid ester at a temperature between about 60° C. and 150° C. The polymerization may require a reaction period of twenty-four hours or longer at the lower reaction temperatures, and a reaction period as short as five minutes may be satisfactory to complete the curing of the polymer product at the higher temperatures. Reaction temperatures lower than 60° C. or higher than 150° C. can be employed in particular cases if desired.

The relative concentrations of the reactants can be varied over a wide range in producing the flame-resistant resins. For example, pentaerythritol has four hydroxyl groups (tetrafunctional) and 3,9-dialkenylspirobi(meta-dioxane) has two double bonds (difunctional) so that the theoretical combining ratio is two moles of 3,9-dialkenylspirobi(meta-dioxane) for every mole of pentaerythritol. However, resins with desirable properties can be produced over the range of between one mole and three moles of 3,9-dialkenylspirobi(meta-dioxane) for every mole of pentaerythritol. Generally, it is practical to use not less than two moles of 3,9-dialkenylspirobi(meta-dioxane) for each mole of pentaerythritol reacted. Preferably, a quantity of 3,9-dialkenylspirobi(meta-dioxane) is employed which is about equivalent to the functionality of both the aliphatic polyhydric alcohol and the pentaerythritol phosphorous acid ester. As mentioned previously, the pentaerythritol phosphorous acid ester has free hydroxyl groups which react with olefinic groups during the polymerization reaction.

The pentaerythritol phosphorous acid ester is incorporated into the resin in an amount which is between about 5 percent and 30 percent of the weight of reactants, i.e., the total weight of 3,9-dialkenylspirobi(meta-dioxane), aliphatic polyhydric alcohol and pentaerythritol phosphorous acid ester. Quantities less than about 5 percent by weight can be incorporated into the compositions but it has been found in many cases that the resins containing lesser quantities of pentaerythritol phosphorous acid ester support combustion and are not self-extinguishing. Similarly, quantities of pentaerythritol phosphorous acid ester in excess of about 30 percent by weight of the total weight of reactants polymerized can be employed if desired. However, such larger quantities of pentaerythritol phosphorous acid ester do not appreciably increase the flame-resistance of the resins and they may deleteriously affect other characteristics of the resins.

The pentaerythritol phosphorous acid ester is sufficiently acidic to promote the formation of resins from the reaction mixtures. However, it is more convenient to conduct the polymerization reactions in the presence of an acidic curing catalyst to increase the rate and efficiency of the reaction. Satisfactory curing catalysts include acidic catalysts such as sulfuric acid, toluenesulfonic acid, benzenesulfonic acid, boron trifluoride aluminum chloride, stannic chloride, titanium tetrachloride, phenyl acid phosphate, octylphenyl acid phosphate, and the like. Curing catalyst concentrations can vary from as little as 0.1 weight percent for the more active catalysts to 1.0 weight percent or more for the less active catalysts, based on the total weight of reactants.

In another method found convenient for preparing flame-resistant polymers, an unsaturated aldehyde or ketone, such as acrolein, is reacted with pentaerythritol in stoichiometric quantities corresponding to the reciprocal of their functionalities (e.g., three moles of pentaerythritol to four moles of acrolein) to produce a liquid precondensate in the presence of an acid catalyst. The precondensate polymerization reaction is conducted at a temperature between about 60° C. and 100° C. for a period of time between one-half hour and five hours depending on the viscosity desired for the pre-condensate A-stage resin. After the unreacted materials and the water of reaction are removed by distillation, the A-stage resin is usually a viscous liquid which slowly condenses to a solid plastic on standing. For practical purposes, the condensation can be stopped by neutralization or removal of the catalyst. The neutral liquid resin condensate can be stored until needed.

Flame-resistant polymers are prepared from the liquid A-stage resin condensate by admixing a calculated quantity of pentaerythritol phosphorous acid ester with said liquid resin and heating the mixture until complete curing is obtained. A curing catalyst is also added to the mixture prior to the polymerization reaction unless the catalyst employed for preparing the liquid A-stage resin is still present in the mixture in a sufficient quantity to promote the formation of a cured flame-resistant resinous product. This final cure can be accomplished at the same temperature employed for the formation of the liquid A-stage resin, or at higher temperatures such as between 100° C. and 150° C.

The flame-resistant spirobi(meta-dioxane) polymers of this invention can be employed to produce molded articles, laminates, or any product for which other thermosetting resins are used. They can be cured in any desirable shape or form. These polymers have the advantage of being self-extinguishing when ignited, besides being strong, tough and rigid.

These flame-resistant polymers also have the advantage over many other thermoset resins in that they cure without the formation of volatile by-products, such as water, and there is little or no shrinkage during the curing process.

The following examples will serve to illustrate specific embodiments of this invention.

*Example 1*

A pentaerythritol phosphorous acid ester flame-proofing additive was prepared in the following manner. A charge of 548 grams of phosphorous trichloride (4.0 moles) and 136 grams of pentaerythritol (1.0 mole) was introduced into a reaction flask fitted with a distillation column. The reaction mixture was heated for three hours at reflux and hydrogen chloride was collected on a cold trap as it evolved during the reaction period. The volatile material was distilled off at a temperature of 150° C. at a pressure of 2 millimeters of mercury. The distillate and the material in the cold trap were combined and redistilled. Approximately four moles of hydrogen chloride and two moles of unreacted phosphorous trichloride were recovered.

To the residual material in the reaction flask, there was added approximately 100 milliliters of water at a slow rate with the temperature being maintained at 110° C. to 125° C. and with water and hydrochloric acid being continuously removed as a distillate. At the conclusion of this operation the reaction mixture was heated to remove materials volatile up to a temperature of 150° C. at 3 millimeters of mercury. The product material recovered was a light colored, viscous liquid which weighed 254 grams. By elemental analysis it was determined that the product mixture contained 23.3 percent phosphorous and 0.6 percent chlorine. The molecular weight was 182 as determined by ebullioscopic analysis and the equivalent weight was found to be 69 by hydroxyl analysis.

*Example 2*

A charge of 926 grams of acrolein (96 percent), 1300 grams of pentaerythritol and 9.6 grams of 37 percent hydrochloric acid was heated at a temperature of 73° C. to 79° C. for a period of one and one-half hours. Components of the reaction mixture were removed which were volatile up to a temperature of 70° C. at 4 millimeters of mercury. The residual material was recovered as 1808 grams of A-stage liquid.

A mixture of 120 grams of this A-stage liquid and 24 grams of the pentaerythritol phosphorous acid ester flame-proofing additive of Example 1 was heated at a temperature of 75° C. for a period of five minutes. It was then poured into molds and cured for sixteen hours at a temperature of 100° C. to form bars measuring 5″ x ½″ x ⅛″. The resulting polymer was a hard, tough, transparent material. When tested for flamability according to ASTM–D635–44, the plastic bars were self-extinguishing after they were repeatedly ignited.

*Example 3*

A mixture of 200 grams of the A-stage liquid described in Example 2 and 50 grams of the pentaerythritol phosphorous acid ester of Example 1 was heated at a temperature of 75° C. for a period of one-half hour. It was then poured into molds and cured for sixteen hours at a temperature of 100° C. to form bars (5″ x ½″ x ⅛″). The resulting polymer was a hard, tough, transparent material which was self-extinguishing when tested for flammability according to ASTM–D635–44.

*Example 4*

A charge of 53 grams of 3,9-divinylspirobi(meta-dioxane), 12.5 grams of pentaerythritol and 9 grams of the pentaerythritol phosphorous acid ester flame-proofing additive of Example 1 was introduced into a reaction flask and heated at a temperature of 150° C. for a period of fifteen minutes. The mixture was then cooled to a temperature of 68° C. and 0.216 gram of diethyl sulfate was added. After it was poured into molds, the material was cured for sixteen hours at a temperature of 150° C. to form bars (5″ x ½″ x ⅛″). The resulting plastic material was tested for flammability according to ASTM–D635–44 and found to be self-extinguishing.

*Example 5*

A charge of 200 grams of an A-stage resin prepared in the same manner described in Example 2, 20 grams of 3,9-divinylspirobi(meta-dioxane) and 40 grams of the pentaerythritol phosphorous acid ester flame-proofing additive of Example 1 was reacted at a temperature of 75° C. for a period of twenty-five minutes. The mixture was then cured in molds and tested for flammability in the same manner as in the preceding examples and the material was found to be self-extinguishing.

*Example 6*

A mixture of 180 grams of an A-stage resin prepared in the same manner described in Example 2 and 20 grams of the pentaerythritol phosphorous acid ester flame-proofing additive of Example 1 was heated at a temperature of 75° C. for a period of five minutes. The resulting plastic was hard, tough, slightly yellow and transparent, and it was found to be self-extinguishing when molded and tested for flammability in the same manner as in the preceding examples.

*Example 7*

A charge of 71 grams of 3,9-divinylspirobi(meta-dioxane), 13 grams of glycerol and 19 grams of the pentaerythritol phosphorous acid ester flame-proofing additive of Example 1 was introduced into a reaction flask and heated at a temperature of 115° C. for a period of ten minutes. After curing for sixteen hours to form bars, the resulting plastic material was clear, hard and tough and was found to be self-extinguishing when tested for flammability in the same manner as in the preceding examples.

What is claimed is:

1. A curable composition comprising 3,9-dialkenyl-spirobi(meta-dioxane) having between two and eighteen carbon atoms in each alkenyl radical, aliphatic polyhydric alcohol, and between about 5 weight percent and 30 weight percent, based on the total composition weight, of pentaerythritol phosphite material of the class produced by hydrolysis of the reaction product derived from the condensation of pentaerythritol with phosphorous trichloride.

2. A curable composition comprising 3,9-dipropenyl-spirobi(meta-dioxane), pentaerythritol, and between about 5 weight percent and 30 weight percent, based on the total composition weight, of phosphorous acid ester material comprising:

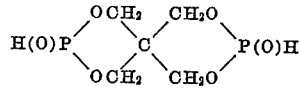

3. A curable composition comprising 3,9-diisopropenylspirobi(meta-dioxane), pentaerythritol, and between about 5 weight percent and 30 weight percent, based on the total composition weight, of phosphorous acid ester material comprising:

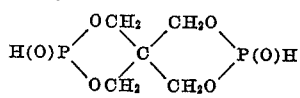

4. A curable composition comprising 3,9-di(1-chlorovinyl)spirobi(meta-dioxane), pentaerythritol, and between about 5 weight percent and 30 weight percent, based on the total composition weight, of phosphorous acid ester material comprising:

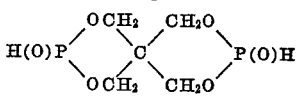

5. A curable composition comprising 3,9-divinylspirobi(meta-dioxane), pentaerythritol and between about 5 weight percent and 30 weight percent, based on the total composition weight, of phosphorous acid ester material comprising:

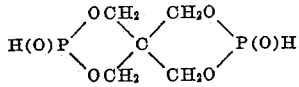

6. A curable composition comprising 3,9-divinylspirobi(meta-dioxane), glycerol and between about 5 weight percent and 30 weight percent, based on the total composition weight, of phosphorous acid ester material comprising:

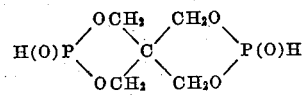

7. A curable composition comprising 3,9-dialkenyl-spirobi(meta-dioxane) having between two and eighteen carbon atoms in each alkenyl radical, aliphatic polyhydric alcohol, and between about 5 weight percent and 30 weight percent, based on the total composition weight, of phosphorous acid ester material comprising:

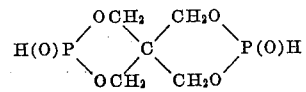

8. A process for preparing resins which comprises heating at reaction temperature 3,9-dialkenylspirobi(meta-dioxane) having between two and eighteen carbon atoms in each alkenyl radical, aliphatic polyhydric alcohol, and between about 5 weight percent and 30 weight percent, based on the total composition weight, of phosphorous acid ester material comprising:

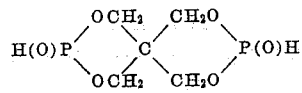

9. A process for preparing flame-resistant resins which comprises heating at reaction temperature in the presence of an acidic catalyst 3,9-divinylspirobi(meta-dioxane), pentaerythritol, and between about 5 weight percent and 30 weight percent, based on the total composition weight, of phosphorous acid ester material comprising:

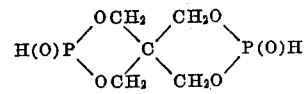

10. The process of claim 9 wherein said acidic catalyst is dialkyl sulfate.

11. A curable composition comprising a liquid resin condensate of acrolein and pentaerythritol, and between about 5 weight percent and 30 weight percent, based on the total composition weight, of phosphorous acid ester material comprising:

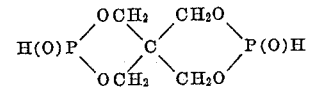

12. The composition of claim 7 cured at a temperature between 60° C. and 150° C.

13. The composition of claim 11 cured to a solid resin at a temperature between 60° C. and 150° C.

No references cited.

UNITED STATES PATENT OFFICE
CERTIFICATION OF CORRECTION

Patent No. 2,957,856                          October 25, 1960

Howard R. Guest et al.

It is hereby certified that error appears in the above numbered patent requiring correction and that the said Letters Patent should read as corrected below.

Column 1, line 54, for "sjirobi(meta-di-" read
-- spirobi(meta-di- --; column 4, line 25, after "boron trifluoride" insert a comma; column 5, lines 7 and 17, Example 1, for "phosphorous", each occurrence, read
-- phosphorus --; column 6, line 45, for "phosphorous" read
-- phosphorus --.

Signed and sealed this 30th day of May 1961.

(SEAL)
Attest:

ERNEST W. SWIDER                                            DAVID L. LADD
Attesting Officer                                               Commissioner of Patents